US010450159B2

(12) United States Patent
Dekel et al.

(10) Patent No.: US 10,450,159 B2
(45) Date of Patent: Oct. 22, 2019

(54) VACUUM WITHIN A PALLET CONVEYOR FOR A PRINTING SYSTEM

(71) Applicant: HP SCITEX LTD., Netanya (IL)

(72) Inventors: Yaron Dekel, Gan-Yeoshaya (IL); Yuval Dim, Moshav Haniel (IL); Itshak Bushmits, Netanya (IL); Alex Veis, Kadima (IL)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 15/681,718

(22) Filed: Aug. 21, 2017

(65) Prior Publication Data

US 2018/0118495 A1 May 3, 2018

(30) Foreign Application Priority Data

Oct. 31, 2016 (EP) .................................... 16196632

(51) Int. Cl.

*B65G 11/00* (2006.01)
*B65H 29/24* (2006.01)
*B41J 11/00* (2006.01)
*B41J 11/06* (2006.01)

(52) U.S. Cl.

CPC .......... *B65H 29/242* (2013.01); *B41J 11/007* (2013.01); *B41J 11/0085* (2013.01); *B41J 11/06* (2013.01); *B65H 2406/3222* (2013.01); *B65H 2406/3223* (2013.01); *B65H 2801/21* (2013.01)

(58) Field of Classification Search

CPC .... B65G 59/066; B65G 59/067; B65G 15/58; B65G 17/323

USPC ............ 198/345.2, 345.3, 465.2, 689.1, 811; 414/222.03; 271/197

See application file for complete search history.

(56) References Cited

U.S. PATENT DOCUMENTS

| | | | | |
|---|---|---|---|---|
| 3,592,334 A * | 7/1971 | Fleischauer | B65G 21/2036 198/629 |
| 3,608,697 A * | 9/1971 | Wahle | B65B 35/28 198/460.1 |
| 3,805,683 A * | 4/1974 | Hook | B65H 29/242 271/197 |
| 5,143,196 A * | 9/1992 | Henn | B24B 9/102 198/345.3 |
| 5,297,059 A | 3/1994 | Kawasoe | |
| 5,553,536 A * | 9/1996 | Van Os | B41F 15/0827 101/115 |
| 5,736,102 A * | 4/1998 | Seaton | G01N 21/13 198/465.2 |
| 5,954,189 A * | 9/1999 | Averill | B41F 5/24 198/803.5 |
| 7,296,792 B2 | 11/2007 | Kondratuk et al. | |

(Continued)

FOREIGN PATENT DOCUMENTS

| | | |
|---|---|---|
| CN | 101376300 B | 3/2009 |
| CN | 102180031 A | 9/2011 |

(Continued)

*Primary Examiner* — Joseph A Dillon, Jr.

(74) *Attorney, Agent, or Firm* — HP Inc. Patent Department

(57) ABSTRACT

In one example, a pallet conveyor for a printing system is described, having a track, a pallet to support a print substrate and move on the track, and a vacuum mechanism to selectively apply a vacuum at the pallet. A boundary of the vacuum applied at the pallet is synchronized with an edge of the print substrate.

11 Claims, 5 Drawing Sheets

(56) References Cited

U.S. PATENT DOCUMENTS

| | | | | |
|---|---|---|---|---|
| 8,047,646 | B2 * | 11/2011 | Ando | B41J 3/28 347/104 |
| 8,528,717 | B2 * | 9/2013 | Ando | B41F 17/005 198/306 |
| 8,714,735 | B2 | 5/2014 | Kato et al. | |
| 9,114,646 | B2 | 8/2015 | Ishimori et al. | |
| 9,180,691 | B2 | 11/2015 | Wanibuchi | |
| 9,421,795 | B2 * | 8/2016 | Dekel | B41J 11/007 |
| 2011/0139586 | A1 * | 6/2011 | Lin | B29D 29/06 198/689.1 |
| 2011/0157288 | A1 | 6/2011 | Morimoto et al. | |
| 2012/0065045 | A1 | 3/2012 | DeMatteis | |
| 2012/0281051 | A1 * | 11/2012 | Schaeffer | B41J 3/28 347/104 |
| 2013/0088554 | A1 | 4/2013 | Veis | |
| 2014/0212255 | A1 * | 7/2014 | Pryor | B65B 25/06 414/797.8 |
| 2015/0259144 | A1 | 9/2015 | Hershfeld | |
| 2016/0129699 | A1 * | 5/2016 | Dekel | B41J 11/007 347/104 |
| 2016/0143196 | A1 * | 5/2016 | Ishitani | H05K 13/0434 414/222.03 |
| 2016/0176204 | A1 | 6/2016 | Dvori et al. | |
| 2017/0369263 | A1 * | 12/2017 | Veis | B41J 11/06 |

FOREIGN PATENT DOCUMENTS

| | | | |
|---|---|---|---|
| CN | 105584232 | B | 5/2016 |
| CN | 105745080 | A | 7/2016 |
| CN | 105936417 | B | 9/2016 |
| EP | 0870606 | A3 | 1/1999 |
| JP | 2012218407 | | 11/2012 |

* cited by examiner

VACUUM WITHIN A PALLET CONVEYOR FOR A PRINTING SYSTEM

CROSS-REFERENCE TO RELATED APPLICATION

This application claims foreign priority to European Patent Application No. 16196632.0, filed on Oct. 31, 2016, and entitled "VACUUM WITHIN A PALLET CONVEYOR FOR A PRINTING SYSTEM".

BACKGROUND

Pallet conveyors for printers may be arranged to convey pallets on a track in a printing system. The track may be an endless track. The pallets support and move print media during printing. The pallets may support the print media as it passes through a print zone of the printer. The pallets may include a driving mechanism, such as an electromagnetic element or magnetic responsive material, so that the velocity of individual pallets may be controlled as they move on the track. A vacuum may be generated to apply a pressure gradient to the print media through a pallet. The vacuum may be used to draw and removably secure the print media to a surface of the pallet during printing.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
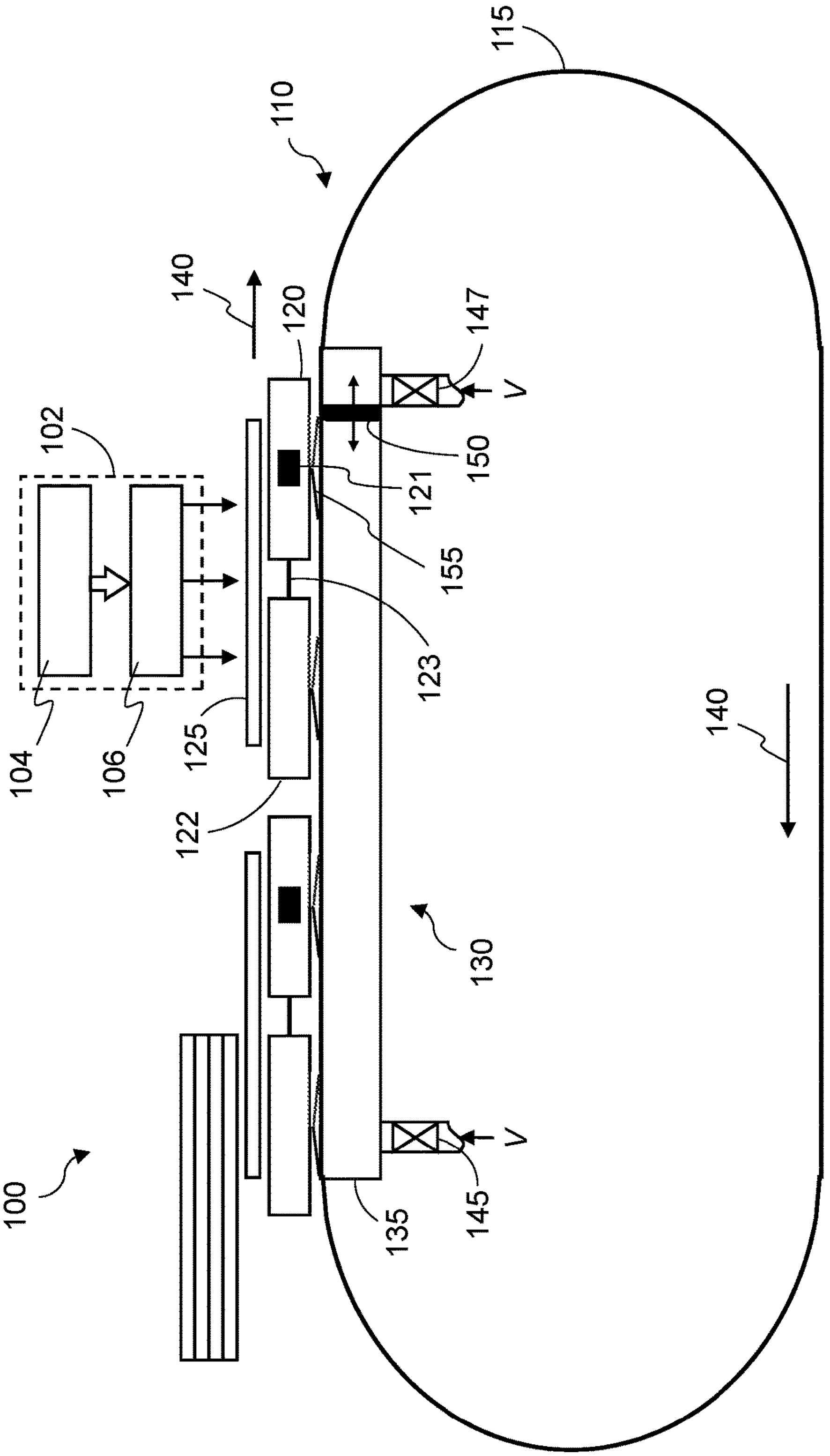
FIG. 1 is a side view schematically illustrating a pallet conveyor for a printing system according to an example.

Certain examples described herein relate to printing systems with pallets to convey print media. These pallets comprise moveable platforms or surfaces that support a supplied print media. A sheet of print media may rest on top of a pallet or train of pallets and be driven through a print zone. In the print zone, printing fluid may be applied, e.g. using inkjet print-heads mounted above the pallet conveyor. In certain systems, a vacuum mechanism may be used to secure the print media to the pallets via suction, e.g. by maintaining a low pressure chamber underneath the pallet conveyor that draws air at an ambient pressure above the pallet conveyor. In these systems, there may be leakage of the vacuum. At the beginning or end of a printing operation, most of the vacuum mechanism may be exposed to the atmosphere, e.g. a large proportion of conduits to a low pressure chamber forming part of the vacuum mechanism may be exposed rather than covered by a sheet of print media. This can cause vacuum to leak and vacuum pressure in the vacuum mechanism to drop, e.g. due to the inflow of higher pressure air from the atmosphere. For example, when sheets of print media are conveyed on pallets in a conveyance direction through the print zone, the vacuum mechanism may be substantially covered by the print media. Thus, there may be minimal leakage. However, when a first sheet of print media is loaded and conveyed by the pallets through the print zone, the vacuum mechanism ahead of the first sheet (in the conveyance direction) may be exposed to atmosphere. Similarly, when a last sheet of print media is exiting the print zone, the vacuum mechanism behind the last sheet may be open to atmosphere, again causing vacuum leakage.

Certain examples described herein act to reduce vacuum leakage during operation of a printing system utilising a pallet conveyor. In these examples, the vacuum mechanism is constructed to selectively apply a vacuum or negative pressure at the pallets. The application of the vacuum is controlled such that a boundary of the vacuum applied at the pallet is synchronised with an edge of a print substrate, e.g. a sheet or section of print media.

In certain examples, the edge of the print substrate may be a leading edge of the print substrate, for example a leading edge of a first sheet of print media. In other examples, the edge of the print substrate is a trailing edge of the print substrate, for example a trailing edge of a last sheet of print media. In some examples, the boundary of the vacuum may be synchronised at both the leading and trailing edge of the print substrate, e.g. for a set of sheets of print media. The print substrate may comprise a single sheet of print media or multiple sheets.

In these examples, the vacuum mechanism may comprise an elongate vacuum chamber arranged parallel to the conveyance direction of the pallets. The pallets may be conveyed above and along the vacuum chamber, with vacuum or low pressure supplied to (or generated within) the vacuum chamber. The vacuum may be communicated to the print substrate via the pallets, e.g. through apertures or inlets in the chamber and pallets. In certain cases, suction cups on a surface of the pallets may act as conduits to the vacuum chamber.

In certain examples, the elongate vacuum chamber may be partitioned into a plurality of sub-chambers, each sub-chamber having a vacuum supply via a valve connecting the chamber to a vacuum source. Prior to loading print media into the printing system, all valves are closed and no vacuum is supplied to the sub-chambers. After a first sheet of print media is loaded, and as it is conveyed along the elongate vacuum chamber, a vacuum sub-chamber immediately ahead of a leading edge of the first sheet may be activated by opening the corresponding valve. During conveyance of a last sheet of print media through the printing system, a vacuum sub-chamber immediately behind the last sheet may be disengaged from its vacuum supply after the trailing edge of the last sheet has passed the sub-chamber by closing the corresponding valve. In these examples, some vacuum leakage may occur, limited to a surface area of a single vacuum sub-chamber. A vacuum source may be powerful enough to keep the vacuum pressure constant with this amount of leakage.

In other examples, vacuum leakage may be reduced by a vacuum mechanism to selectively apply vacuum at the pallets in a more continuous manner. For instance, in these examples, the vacuum boundary may be controllably positioned within the vacuum mechanism.

Certain examples will now be described with reference to the Figures.

FIG. 1 is a side view schematically illustrating a pallet conveyor 110 for a printing system 100 according to an example. The pallet conveyor 110 comprises a track 115 and a pallet 120. The pallet 120 is arranged to support a print substrate 125 and move on the track 115. The pallet conveyor 110 also comprises a vacuum mechanism 130 to selectively apply a vacuum at the pallet 120, such that a boundary of the vacuum applied at the pallet 120 is synchronised with an edge of the print substrate 125. The print substrate 125 may comprise one sheet of media for printing, for example, or multiple sheets that are conveyed by the pallet conveyor 110. The edge of the print substrate may be a leading edge of the first sheet of print substrate 125 in one example, or may be a trailing edge of the same or another succeeding sheet of print substrate 125 in another example.

In the example shown in FIG. 1, the pallet 120 is a train pallet which may tow a wagon pallet 122. As used herein, "train pallet" means an active pallet bearing at least part of the driving mechanism of the train-and-wagon configuration and "wagon pallet" means a passive pallet dragged or towed by a train pallet either directly or indirectly. The train and wagon pallets 120, 122 may support the print substrate 125. In the example of FIG. 1, the train pallet 120 tows only one wagon pallet 122, however, the number of wagon pallets may vary in implementations. A train pallet may tow a wagon pallet configuration that may comprise a single wagon pallet or a plurality of wagon pallets coupled between them in a successive manner. The number of wagon pallets in a wagon pallet configuration may be limited by a size or power of a driving mechanism 121 of the train pallet. As the number of wagon pallets in a wagon pallet configuration increases the train-and-wagon configuration may become more flexible. Accordingly, a wagon pallet configuration with fewer pallets may require a train pallet with smaller driving mechanism parts, such as motors.

The train pallet 120 may be the leading pallet of the train-and-wagon configuration and the wagon pallet 122 may be the leading pallet of the wagon pallet configuration. In the example of FIG. 1, as there is only one wagon pallet in the wagon pallet configuration, the wagon pallet 122 is also the last pallet of the train-and-wagon configuration. A coupling 123 may maintain the distance between the two pallets substantially constant as the pallets are conveyed on the track 115. In certain cases, the distance maintained by the coupling 123 may be such that no print substrate 125 may be trapped between the pallets 120, 122. The train pallet 122 may comprise at least part of the driving mechanism 121 that provides the motive power to the train-and-wagon configuration and may be operably coupled with the track 115. The driving mechanism 121 may comprise at least part of a motor, drivers, controllers and encoder heads. The track 115 may be an endless track. The wagon pallet 122 may be merely dragged by the train pallet 120 along the endless track and may not be individually controlled. The pallet conveyor 110 may include multiple train-and-wagon configurations, as shown in the example of FIG. 1. A wagon pallet may be directly dragged by a train pallet when it is directly coupled to a train pallet. However, a wagon pallet may form part of a wagon pallet configuration, i.e. a series of wagon pallets coupled together. In such a scenario, a particular wagon pallet may be indirectly dragged by a train pallet when it belongs to a wagon pallet configuration that is being dragged by a train pallet even though the particular wagon pallet is not directly coupled to the train pallet.

In the example of FIG. 1, the vacuum mechanism 130 comprises an elongate vacuum chamber 135 arranged parallel to a conveyance direction 140 of the pallet 120. The elongate vacuum chamber 135 may be connected to a first valve 145 and a second valve 147 for supplying vacuum to the elongate vacuum chamber (the vacuum supply via the first and second valves 145, 147 is labelled V in FIG. 1). The first and second valves 145, 147 may control a supply of vacuum, or negative pressure, to the elongate vacuum chamber 135 from a vacuum source (not shown in FIG. 1). For example, when one of the first and second valves 145, 147 is open, a vacuum may be applied from the vacuum source to the elongate vacuum chamber 135 by that valve. Similarly, when one of the first and second valves 145, 147 is closed, vacuum may not be applied to, i.e. it is blocked from, the elongate vacuum chamber 135 by that valve.

In one case, the vacuum mechanism 130 comprises a moveable surface 150 arranged within, and moveable along the length of, the elongate vacuum chamber 135, such that the moveable surface 150 defines the boundary of the vacuum applied when one of the first valve 145 and the second valve is open 147 and the other is closed. The moveable surface 150 may, in one example, comprise a piston to move longitudinally within the elongate vacuum chamber 135. The moveable surface 150 may partition the elongate vacuum chamber 135 into two sub-chambers, with the moveable surface 150 being a boundary between the two sub-chambers. Thus, in an example where one of the sub-chambers is coupled to the first valve 145, and the other is coupled to the second valve 147, the moveable surface 150 may be the boundary of the vacuum applied when one of the first valve 145 and the second valve is open 147 and the other is closed. An example of a mechanism for the moveable surface 150 moving along the length of the elongate vacuum chamber 135 is described below with reference to FIG. 3.

In one case, synchronisation of the boundary of the vacuum applied at the pallet 120 and the edge of the print substrate 125 may be via an optical detector to detect a position and velocity of the edge and feedback to a controller to control the moveable surface 150 accordingly. For example, the moveable surface 150 may be synchronised with the leading edge of the print substrate such that it moves ahead of the leading edge by a small amount, e.g. by a proportion of the length of the pallet or print substrate.

In the example of FIG. 1, the pallet 120 comprises a slider 155 to operably couple the pallet 120 and the track 115. The slider may be slidable along the vacuum mechanism 130, for example along the elongate vacuum chamber 135. The slider 155 may, in one case, comprise an inlet to communicate the vacuum from an aperture in the elongate vacuum chamber 135 to the pallet 120. In this case, the elongate vacuum chamber 135 may comprise one or more apertures along a surface facing the pallet 120. A vacuum in a portion or sub-chamber of the elongate vacuum chamber 135 may therefore be applied from the elongate vacuum chamber 135 via the one or more apertures, for example. The size of the inlet in the slider 155 may be very small relative to a surface area of the pallet 120 for drawing the print substrate 125 towards the pallet 120.

In one case, the slider 155 has hinged slidable elements, or runners, for example two runners hinged together as shown in FIG. 1. The elements may extend in the conveyance direction 140 and may have a hinged axis, i.e. an axis about which the elements hinge, perpendicular to the conveyance direction. The hinged axis may also be in the same plane as the conveyance direction 140, in one example. The inlet in the slider 155 may, for example, comprise a slit along a length of one or more of the hinged slidable elements or runners. Each slider 155 may run within a suitable channel. The channel may form part of the track 115 and may act to slidably couple the pallet to the track 115. In certain examples, the track 115 is an endless track, and the pallet 120 circulates on the track 115.

The printing system 100 shown in FIG. 1 comprises a printing mechanism 102 defining a print zone to apply printing fluid to a print substrate 125. In one case, the printing mechanism 102 may include printing fluid supplies 104, for example ink supplies, for supplying printing fluid to a print-head assembly 106. The print-head assembly 106 may include an arrangement of print-heads for dispensing printing fluid on to a sheet or continuous web of paper or other print substrate 125. The print-head assembly 106 may be stationary with an array of print-heads that may span the maximum width of the print substrate 125, or may be a carriage mounted to scan the print-head(s) back and forth across print substrate 125. The print-head assembly 106 may be positioned in the print zone to print onto the print substrate 125 carried by the pallet 120 in the print zone.

In certain cases, the vacuum mechanism 130 may comprise a plurality of elongate vacuum chambers 135 spaced orthogonally to the conveyance direction 140 of the pallets 120, 122, with each one arranged parallel to the conveyance direction 140. Each of the plurality of elongate vacuum chambers 135 may be an implementation of the example elongate vacuum chambers 135 herein described, and may be connected to a first valve and a second valve for communicating vacuum to the respective elongate vacuum chamber 135. In certain examples, each elongate vacuum chamber 135 may comprises a moveable surface defining a first partition of the elongate vacuum chamber 135 coupled to the first valve 145, and a second partition of the elongate vacuum chamber 135 coupled to the second valve 147. The moveable surface 150 may be moveable longitudinally within the elongate vacuum chamber 135 to vary the boundary of the vacuum applied when either of the first valve 145 and the second valve 147 is open and the other is closed.

In certain examples, the printing system 100 may comprise a plurality of pulleys driveable by a rotatable shaft to synchronise each moveable surface 150, wherein each pulley comprises a belt extending the length of the elongate vacuum chamber 135 that is moveable about the pulley, and wherein each moveable surface 150 comprises a piston fixably coupled to a respective belt. This mechanism for moving each moveable surface 150 of the vacuum mechanism 130 is described in more detail below with reference to FIGS. 3*a* and 3*b*. Features in FIGS. 3*a* and 3*b* that may correspond, in certain cases, to a feature in FIG. 1 are referenced by their numeral in FIG. 1 incremented by 200.

Figure 2:
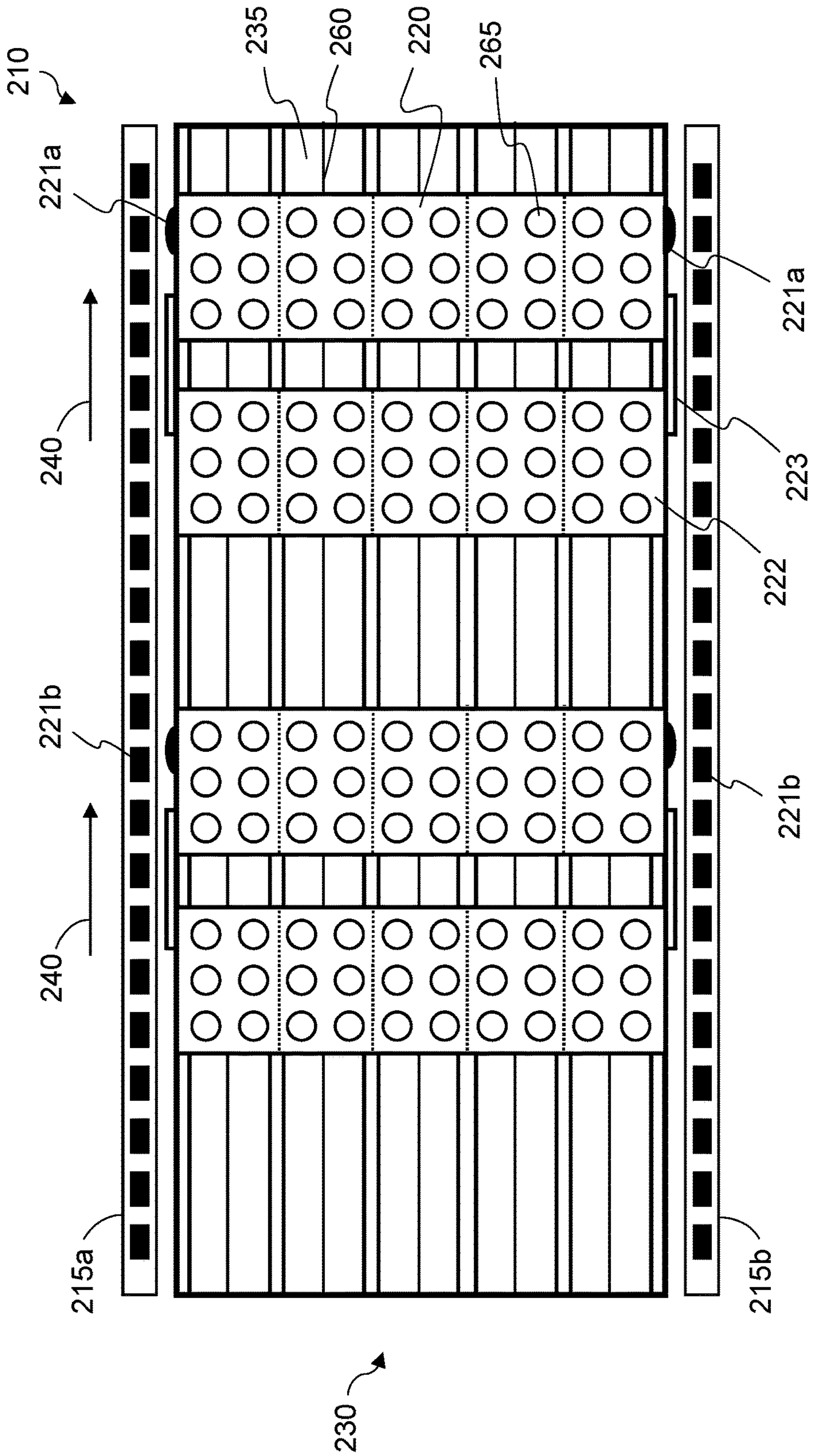
FIG. 2 is a top-down view schematically illustrating a pallet conveyor for a printing system according to an example.

FIG. 2 is a top-down view schematically illustrating a pallet conveyor 210 for a printing system according to an example. Pallet conveyor 210 comprises a track 215*a*, 215*b* and a pallet 220 to support a print substrate (not shown). The pallet 220 moves on the track 215*a*, 215*b*. The pallet conveyor 210 also comprises a vacuum mechanism 230 to selectively apply a vacuum at the pallet 220, such that a boundary of the vacuum applied at the pallet 220 is synchronised with an edge of the print substrate. The edge of the print substrate may be a leading edge of the first sheet of print substrate in one example, or may be a trailing edge of the same or another succeeding sheet of print substrate in another example.

In the example shown in FIG. 2, the pallet 220 is a train pallet which may tow a wagon pallet 222 in a conveyance direction 240. A coupling 223 may couple the pallets 220, 222 and may, in certain cases, maintain the distance between the two pallets 220, 222 substantially constant as the pallets are conveyed on the track 215*a*, 215*b*. The train pallet 220 may provide the motive power and may be operably coupled with the track 215*a*, 215*b*. The train pallet 220 and the track 215*a*, 215*b* may be operably coupled together via a first portion 221*a* disposed on the train pallet 220 and a second portion 221*b* disposed along a length of the track 215*a*, 215*b*. One of the respective first and second portions 221*a*, 221*b* may comprise an electromagnetic element and the other of the respective first and second portions 221*a*, 221*b* may comprise a magnetically responsive material. For example, the train pallet may comprise at least part of a driving mechanism, such as a coil motor 221*a* on one or both sides, as shown in FIG. 2. The track may be equipped with the rest of the driving mechanism in the form of a plurality of magnets 221*b* along the sides of the track 215*a*, 215*b*. The train pallets 220 may also comprise encoders to provide feedback controls. The wagon pallet 222 may be dragged by the train pallet 220 along the track 215*a*, 215*b* and may not be individually controlled. Accordingly, a train-and-wagon configuration may comprise the train pallet 220 coupled to the wagon pallet 222 with one or more couplings 223, and coil motors 221*a* on the sides of the train pallet 232.

The pallet conveyor 210 may, in certain examples, also comprise a central controller to individually control the velocity of each train-and-wagon configuration along the track 215*a*, 215*b* by controlling the velocity of each train pallet 220. The central controller may communicate wirelessly with the train pallet controllers and transfer any motion control signals. Electricity may be transferred via sliding brushes. This described driving mechanism is provided as one example. One skilled in the art may appreciate that any other driving mechanism may be used to drive the train pallets.

In one example, the vacuum mechanism 230 comprises a plurality of elongate vacuum chambers 235 arranged substantially parallel to one another as shown in FIG. 2. The plurality of elongate vacuum chambers 235 may in certain cases be arranged substantially parallel to the conveyance direction 240 and may be spaced orthogonally to the conveyance direction 240, as shown in FIG. 2.

In certain examples, each of the plurality of elongate vacuum chambers 235 may be an implementation of the elongate vacuum chamber 135 described with reference to FIG. 1. For example, each elongate vacuum chamber 235 may comprise a first valve and a second valve, separated longitudinally from one another along a length of the respective elongate vacuum chamber 235.

In one case, each elongate vacuum chamber 235 comprises an aperture 260 along a surface facing the pallets 220, 222. A vacuum in a portion or sub-chamber of the elongate vacuum chamber 235 may therefore be applied from the elongate vacuum chamber 235 via the aperture 260, for example. In this case, shown in FIG. 2, each elongate vacuum chamber 235 comprises one aperture 260, however, in other cases each elongate vacuum chamber 235 may have a plurality of apertures. Vacuum, or negative pressure (as compared to an atmospheric pressure), present in each elongate vacuum chamber 235 may therefore be communicated with the pallets 220, 222 via the aperture 260. Vacuum conduits comprised within the pallets 220, 222 may draw and removably secure the print substrate, for example a print media, against and relative to a top surface (facing the print substrate) of the pallets 220, 222. In one example, the pallets 220, 222 may comprise cups 265 on the top surface, e.g. at a conduit mouth or exit, for contacting the print substrate and communicating the vacuum to a surface of the print substrate to draw and removably secure the print substrate to the respective pallet 220, 222. The cups 265 may allow print substrate such as warped boards or corrugated sheets to be drawn to the pallet 220, 222 with less vacuum leakage compared to a flat surface of the pallet 220, 222 with apertures therein for applying the vacuum.

In certain examples, the pallets 220, 222 may each comprise a slider to slide along the surface of the vacuum mechanism 230: in one case the slider may be an implementation of the slider 155 described with reference to FIG. 1. In this case, vacuum may be communicated from each elongate vacuum chamber 235 to the pallets 220, 222 via an inlet in the slider. For example, the surface of the elongate vacuum chamber 235 may comprise a channel within which the slider slides. The channel and slider may comprise apertures to fluidicly couple conduits within the pallet to the vacuum chamber 235.

Each pallet 220, 222 may, in one case, comprise internal sections, as shown in FIG. 2 by the dotted lines subdividing each pallet 220, 222 orthogonally to the conveyance direction 240. Each internal section may be in communication with each of the plurality of elongate vacuum chambers 235, as shown in FIG. 2: each internal section of the pallet 220, 222 may be aligned with one of the elongate vacuum chambers 235. Thus, in this case, vacuum may be selectively applied to the plurality of elongate vacuum chambers 235 via the valves coupled to each elongate vacuum chamber 235. In turn, vacuum may be selectively applied to the internal sections of the pallets 220, 222 such that only selected internal sections may be in communication with the vacuum supply via the plurality of elongate vacuum chambers 235. This may allow different sized print media to be conveyed by the pallet conveyor 210, as the width of the vacuum supply perpendicular to the conveyance direction 240 may be controlled and selected. Thus, for relatively narrower print media, selected elongate vacuum chambers 235 may be closed via the coupled valves such that vacuum is not exposed to outside atmosphere through the pallets 220, 222.

In certain examples, the track 215*a*, 215*b* is an endless track, and the pallets 120, 122 circulate on the track 215*a*, 215*b*.

Figure 3A:
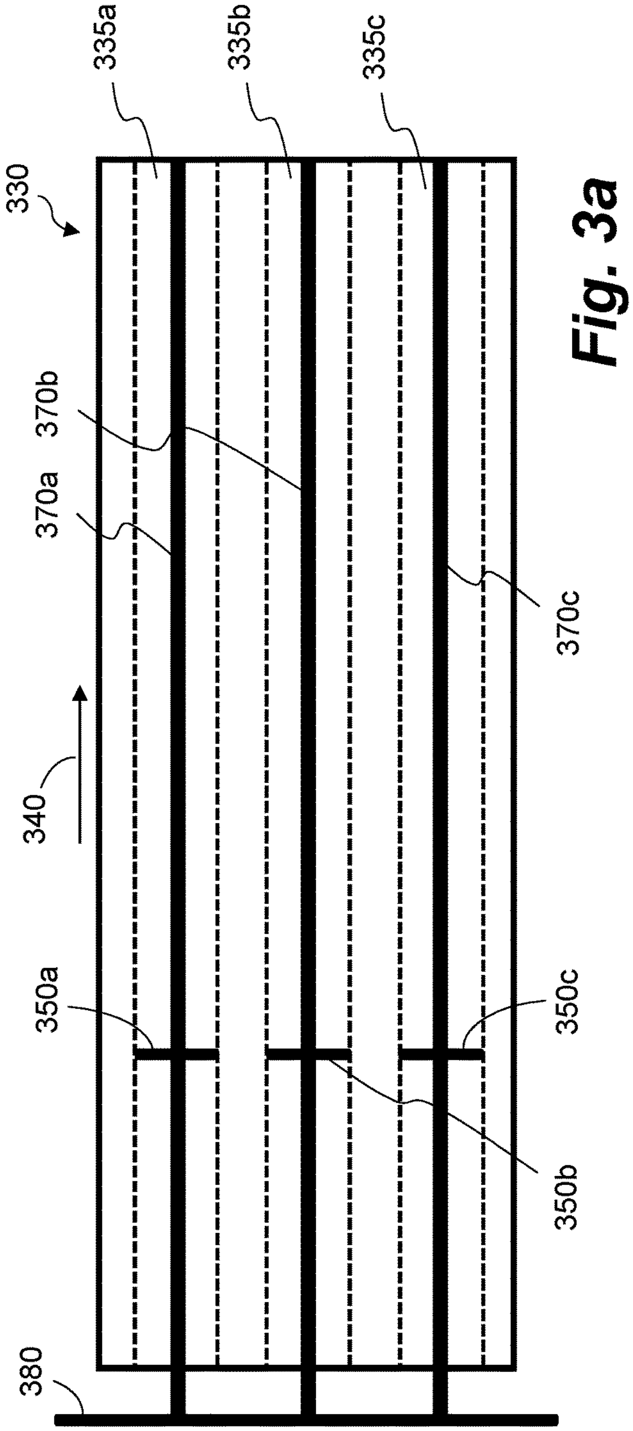
FIG. 3*a* is a schematic illustration showing a top-down cutaway view of a vacuum mechanism for a pallet conveyor according to an example.
Figure 3B:
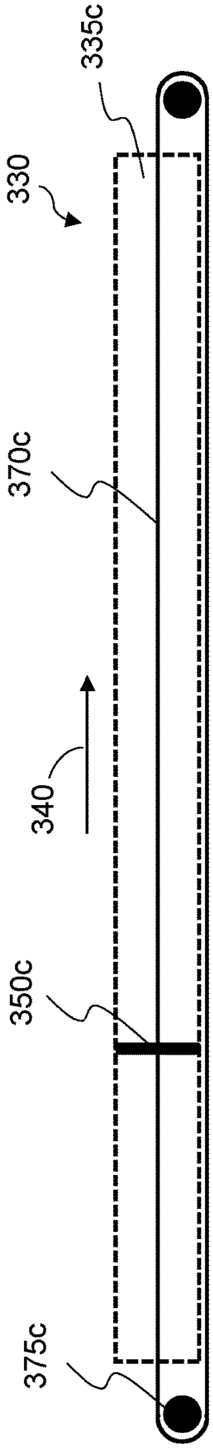
FIG. 3*b* is a schematic illustration showing a side-on cutaway view of the vacuum mechanism of FIG. 3*a;*

FIG. 3*a* is a schematic illustration showing a top-down cutaway view of a vacuum mechanism 330 for a pallet conveyor according to an example. FIG. 3*b* is a schematic illustration showing a side-on cutaway view of the vacuum mechanism of FIG. 3*a*. The vacuum mechanism 330 may comprise a plurality of elongate vacuum chambers 335*a*, 335*b*, 335*c* spaced orthogonally to a conveyance direction 340 of the pallets (not shown in FIG. 3*a*). In certain examples, each of the elongate vacuum chambers 335*a*, 335*b*, 335*c* may be an implementation of the elongate vacuum chamber 135 described with reference to FIG. 1. For example, each elongate vacuum chamber 335*a*, 335*b*, 335*c* may be parallel to the conveyance direction 340, and connected to a first valve and a second valve for communicating vacuum to the respective elongate vacuum chamber 335*a*, 335*b*, 335*c*.

In certain cases, each elongate vacuum chamber 335*a*, 335*b*, 335*c* comprises a moveable surface or piston 350*a*, 350*b*, 350*c* defining a first partition of the elongate vacuum chamber coupled to the first valve and a second partition of the elongate vacuum chamber coupled to the second valve. The piston 350*a*, 350*b*, 350*c* may be moveable longitudinally within the respective elongate vacuum chamber 335*a*, 335*b*, 335*c* to vary the boundary of the vacuum applied when either of the first valve and the second valve is open and the other is closed.

In the example of FIG. 3*b*, the vacuum mechanism may comprise a plurality of pulleys, with each pulley 375*c* associated with one of the elongate vacuum chambers 335*c*. Each pulley 375*c* may be driveable by a rotatable shaft 380 to synchronise the pistons 350*a*, 350*b*, 350*c*. For example, each pulley 375*c* may comprise a belt 370*c* extending the length of the elongate vacuum chamber 335*c*, the belt 370*c* being moveable about the pulley 375*c*. Each piston 350*c* may be fixably coupled to the respective belt 370*c*. As can be seen in FIG. 3*b*, in certain cases the belt 370*c* may extend beyond the length of the elongate vacuum chamber 335*c*, and may be arranged about pulleys at either end of the elongate vacuum chamber 335*c*. In these cases, the belt 370*c* is arranged within the elongate vacuum chamber 335*c* along one length and along an underside of the elongate vacuum chamber 335*c* along the other length.

In the example shown in FIG. 3*a*, driving the rotatable shaft 380 may turn each of the pulleys associated with the elongate vacuum chambers 335*a*, 335*b*, 335*c* such that the belts 370*a*, 370*b*, 370*c* synchronously move the respective coupled pistons 350*a*, 350*b*, 350*c* along the elongate vacuum chambers 335*a*, 335*b*, 335*c* in the conveyance direction 340.

Figure 4:
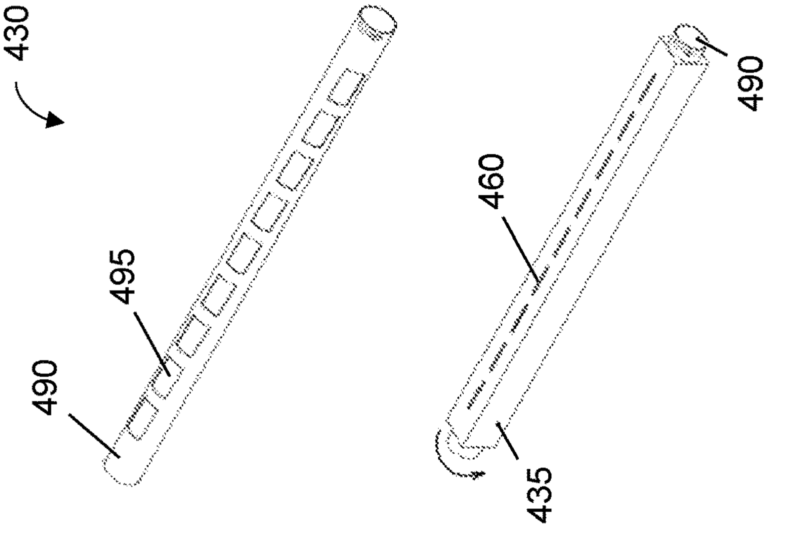
FIG. 4 is a schematic illustration showing a perspective view of a vacuum mechanism for a pallet conveyor according to an example.

FIG. 4 is a schematic illustration showing a perspective view of a vacuum mechanism for a pallet conveyor according to an example. The pallet conveyor may comprise a track, a pallet to support a print substrate and move on the track, and a vacuum mechanism, as described in examples herein with reference to the Figures. The vacuum mechanism selectively applies a vacuum at the pallet, such that a boundary of the vacuum applied at the pallet is synchronised with an edge of the print substrate.

In this example, the vacuum mechanism 430 comprises a rotatable tube 490 arranged within an elongate vacuum chamber 435. The rotatable tube 490 may comprise openings 495 regularly spaced along a length of a surface the rotatable tube, as shown in FIG. 4. The elongate vacuum chamber 435 may be arranged parallel to a conveyance direction of a pallet to move on a track of the pallet conveyor, and may be connected to a first valve and a second valve for supplying vacuum to the elongate vacuum chamber 435.

In the example of FIG. 4, each of the openings 495 may be circumferentially transposed with respect to a preceding opening, and a surface of the elongate vacuum chamber 435 may comprise regularly spaced apertures 460. Thus, in this case, rotation of the rotatable tube 490 varies the alignment between the openings 495 in the surface of the rotatable tube 490 and the apertures 460 in the surface of the elongate vacuum chamber 435. This alignment may define the boundary of the vacuum applied via the elongate vacuum chamber 435. At a position where an opening 495 in the surface of the rotatable tube 490 is aligned with an aperture 460 in the surface of the elongate vacuum chamber 435 (e.g. such that the opening 495 and aperture 460 overlap), a vacuum supplied to the rotatable tube 490 may be communicated via the aligned opening 495 and aperture 460, and may be applied at the pallet. At certain rotational positions of the rotatable tube 490, multiple openings 495 and apertures 460 may be aligned in such a way. The boundary of the vacuum applied at the pallet may therefore be a position where an opening 495 and aperture 460 overlap, and an adjacent opening 495 and aperture 460 do not overlap. There may be one or two boundaries of the vacuum delimited in this way, in some examples. In one instance, this example vacuum mechanism 430 described with reference to FIG. 4 may be implemented in place of the previously described vacuum mechanism 130 described as part of the pallet conveyor example shown in FIG. 1.

Rotation of the rotatable tube 490 may advance, in the conveyance direction of the pallet, the boundary of the vacuum applied to the pallet via the apertures 460 in the surface of the elongate vacuum chamber 435. In some cases, this rotation of the rotatable tube 490 may be synchronised with a leading edge of the print substrate supported and conveyed by the pallet, such that the boundary of the vacuum applied at the pallet is synchronised with the leading edge. For example, the boundary of the vacuum applied at the pallet may advance ahead of the leading edge of the print substrate such that minimal or no vacuum is applied to the pallet, or a top surface of the pallet, where the print substrate is not supported. This may allow vacuum leakage to be minimised and improve the efficiency of the vacuum mechanism and pallet conveyor. In other cases, the rotation of the rotatable tube 490 may be synchronised with a trailing edge of the print substrate supported and conveyed by the pallet, such that the boundary of the vacuum applied at the pallet is synchronised with the trailing edge. Similarly, the boundary of the vacuum applied at the pallet may advance slightly behind the trailing edge of the print substrate such that minimal or no vacuum is applied to the pallet, or a top surface of the pallet, where the print substrate is not supported, for example.

Figure 5:
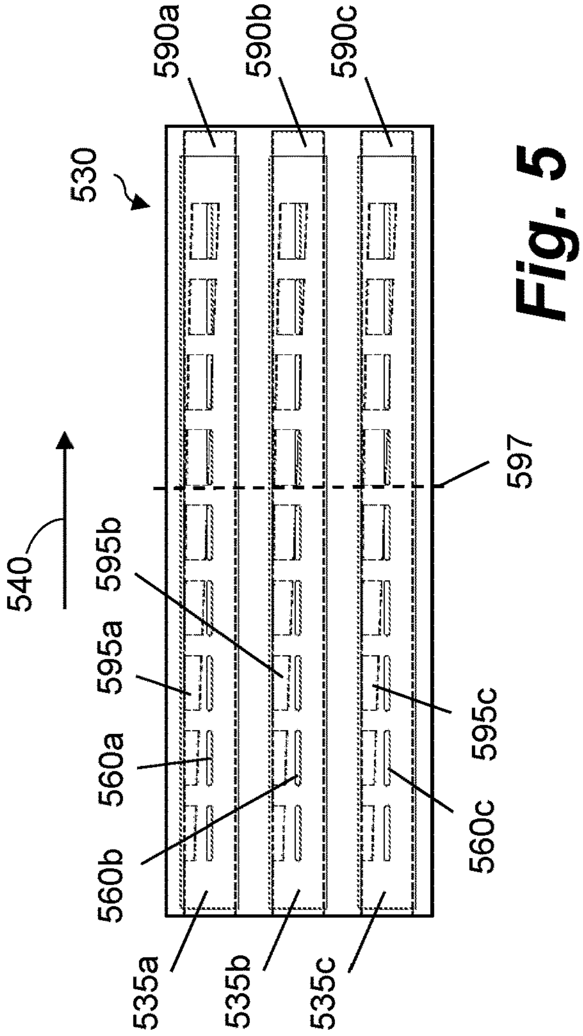
FIG. 5 is a schematic illustration showing a top-down view of a vacuum mechanism for a pallet conveyor according to an example.

FIG. 5 is a schematic illustration showing a vacuum mechanism 530 for a pallet conveyor according to an example. In the example of FIG. 5, the vacuum mechanism 530 comprises a plurality of elongate vacuum chambers 535*a*, 535*b*, 535*c* arranged substantially parallel to one another. In one case, the elongate vacuum chambers 535*a*, 535*b*, 535*c* may be spaced orthogonally to a conveyance direction of pallets conveyed by the pallet conveyor, and each elongate vacuum chamber 535*a*, 535*b*, 535*c* may be substantially parallel to the conveyance direction. The elongate vacuum chambers 535*a*, 535*b*, 535*c* may each be connected to a first valve and a second valve for communicating vacuum to the respective elongate vacuum chamber 535*a*, 535*b*, 535*c*. In one example, each elongate vacuum chamber 535*a*, 535*b*, 535*c* may comprise a rotatable tube 590*a*, 590*b*, 590*c* arranged within the respective elongate vacuum chamber 535*a*, 535*b*, 535*c*. The rotatable tubes 590*a*, 590*b*, 590*c* may each comprise openings 595*a*, 595*b*, 595*c* regularly spaced along a length of a surface the respective rotatable tube 590*a*, 590*b*, 590*c*, for example in accordance with the example rotatable tube 490 described with reference to FIG. 4.

In one case, the elongate vacuum chambers 535*a*, 535*b*, 535*c* may be rotatable synchronously, for example by a single driving mechanism, such that alignments between openings 595*a*, 595*b*, 595*c* in the surface of the rotatable tubes 590*a*, 590*b*, 590*c* and the apertures 560*a*, 560*b*, 560*c* in the surface of the respective elongate vacuum chamber 535*a*, 535*b*, 535*c* vary synchronously. In this case, a boundary 597 of vacuum applied at a pallet may advance in the conveyance direction 540, and may be synchronised with an edge of print substrate supported by the pallet.

The examples of FIGS. 1-5 show components of a printing system that enable more efficient transfer of vacuum from a source to print media with minimal leakage. For example, utilising a moveable piston or rotatable tube within elongate vacuum chambers allows for a position of a vacuum boundary in the vacuum chamber to be moved continuously along the vacuum chamber. Thus, said vacuum boundary may be synchronised with an edge of print media. In certain cases, synchronisation may be controlled using an optical detector to detect the edge of the print substrate and provide feedback to a controller to control the moveable piston or rotatable tube. During printing of a first or last sheet of print media, the vacuum communicating with pallets may therefore be limited by the vacuum boundary so that vacuum does not leak through apertures in the vacuum mechanism that are not covered by the sheet of print media, for example.

Figure 6:
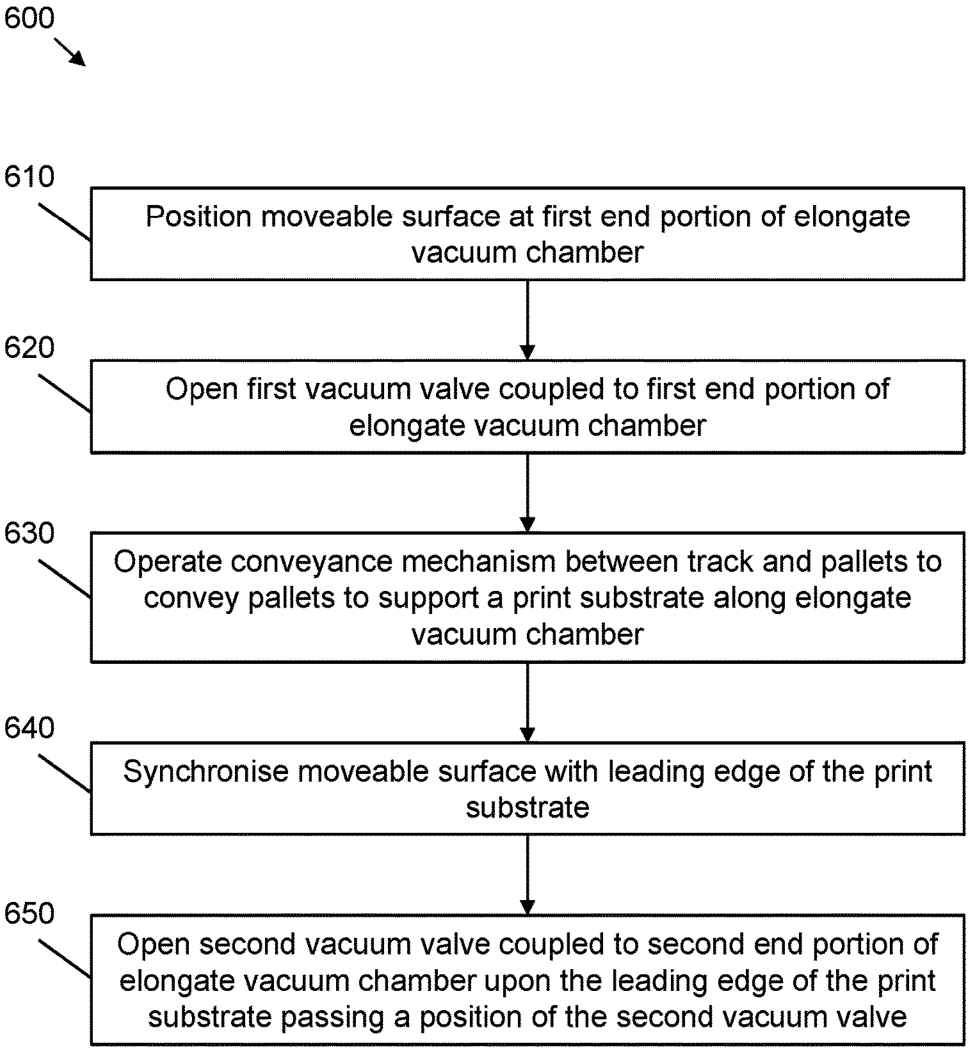
FIG. 6 is a flow diagram showing a method of conveying pallets in a printing system according to an example.

FIG. 6 shows a method 600 of conveying pallets in a printing system according to an example. The printing system may comprise one of the printing system examples previously described. At block 610, a moveable surface within an elongate vacuum chamber is positioned at a first end portion of the elongate vacuum chamber. The moveable surface and elongate vacuum chamber may be implementations, respectively, of one of the moveable surfaces (or pistons) or elongate vacuum chambers previously described with reference to the examples shown in FIGS. 1-5. At block 620, a first vacuum valve coupled to the first end portion of the elongate vacuum chamber is opened. At block 630, a conveyance mechanism between a track and the pallets is operated to convey the pallets to support a print substrate along the elongate vacuum chamber. The conveyance mechanism may correspond to an example conveyance mechanism previously described with reference to FIGS. 1 and 2, for instance the driving mechanisms 121, 221*a* and 221*b*. At block 640, the moveable surface within the elongate vacuum chamber is synchronised with a leading edge of the print substrate. At block 650, a second vacuum valve coupled to a second end portion of the elongate vacuum chamber is opened upon the leading edge of the print substrate passing a position of the second vacuum valve.

In certain examples, the method 600 of conveying pallets in a printing system may further comprise: resetting the moveable surface at the first end portion of the elongate vacuum chamber; closing the first vacuum valve; synchronising the bar with a trailing edge of the print substrate; and closing the second vacuum valve upon the trailing edge of the print substrate passing a position of the second vacuum valve.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A pallet conveyor for a printing system comprising:

a track;

a pallet to move on the track, wherein the pallet includes a slider to operably couple the pallet and the track, wherein the pallet supports a print substrate as the pallet passes through a print zone of the printer; and a vacuum mechanism to selectively apply a vacuum at the pallet, such that a boundary of the vacuum applied at the pallet is synchronised with an edge of the print substrate.

2. The pallet conveyor according to claim 1, wherein the vacuum mechanism comprises an elongate vacuum chamber arranged parallel to a conveyance direction of the pallet, and connected to a first valve and a second valve for supplying vacuum to the elongate vacuum chamber.

3. The pallet conveyor according to claim 2, wherein the vacuum mechanism comprises a moveable surface arranged within, and moveable along the length of, the elongate vacuum chamber, such that the moveable surface defines the boundary of the vacuum applied when one of the first valve and the second valve is open and the other is closed.

4. The pallet conveyor according to claim 2, wherein the slider is slidable along the vacuum mechanism, and comprising an inlet to communicate the vacuum from an aperture in the elongate vacuum chamber to the pallet.

5. The pallet conveyor according to claim 4, wherein the slider comprises hinged slidable elements, said elements extending in the conveyance direction and having a hinged axis perpendicular to the conveyance direction.

6. The pallet conveyor according to claim 2, wherein the elongate vacuum chamber is one of a plurality of elongate vacuum chambers arranged substantially parallel to one another, and wherein the pallet comprises internal sections, each internal section in communication with each of the plurality of elongate vacuum chambers.

7. The pallet conveyor according to claim 2, wherein the vacuum mechanism comprises a rotatable tube arranged within the elongate vacuum chamber, the rotatable tube comprising openings regularly spaced along a length of a surface the rotatable tube.

8. The pallet conveyor according to claim 7, wherein:
- each of the openings is circumferentially transposed with respect to a preceding opening; and
- a surface of the elongate vacuum chamber comprises regularly spaced apertures,
- such that rotation of the rotatable tube varies alignment between the openings in the surface of the rotatable tube and the apertures in the surface of the elongate vacuum chamber to define the boundary of the vacuum.

9. The pallet conveyor according to claim 1 wherein the track is an endless track and the pallet circulates on the track.

10. The pallet conveyor according to claim 1 wherein the pallet is a train pallet.

11. The pallet conveyor according to claim 1 wherein the pallet is a wagon pallet.

* * * * *